July 19, 1927.

H. J. HICK

BATTERY CLAMP

Filed Feb. 6, 1922

1,636,562

2 Sheets-Sheet 1

Inventor

Harry J. Hick

By Frease and Bond

Attorneys

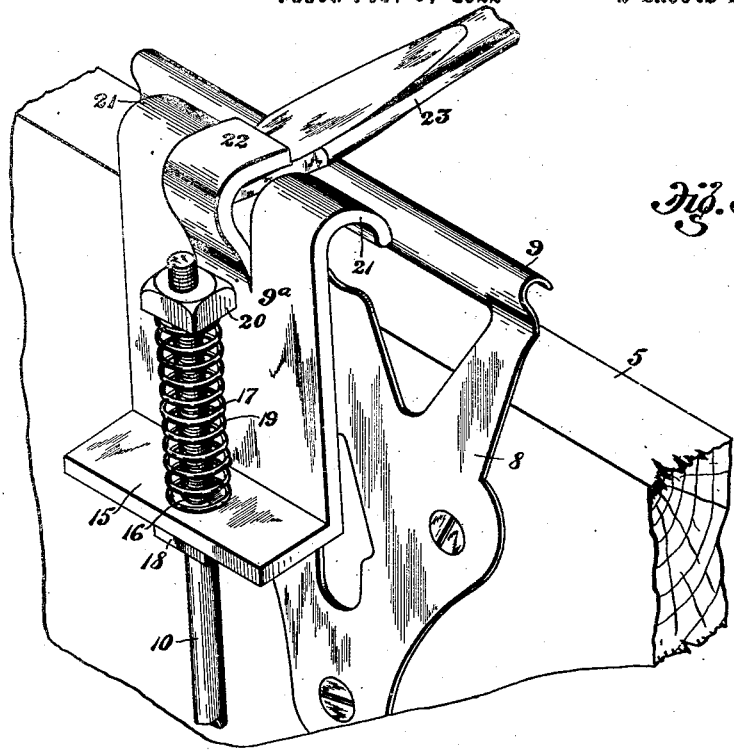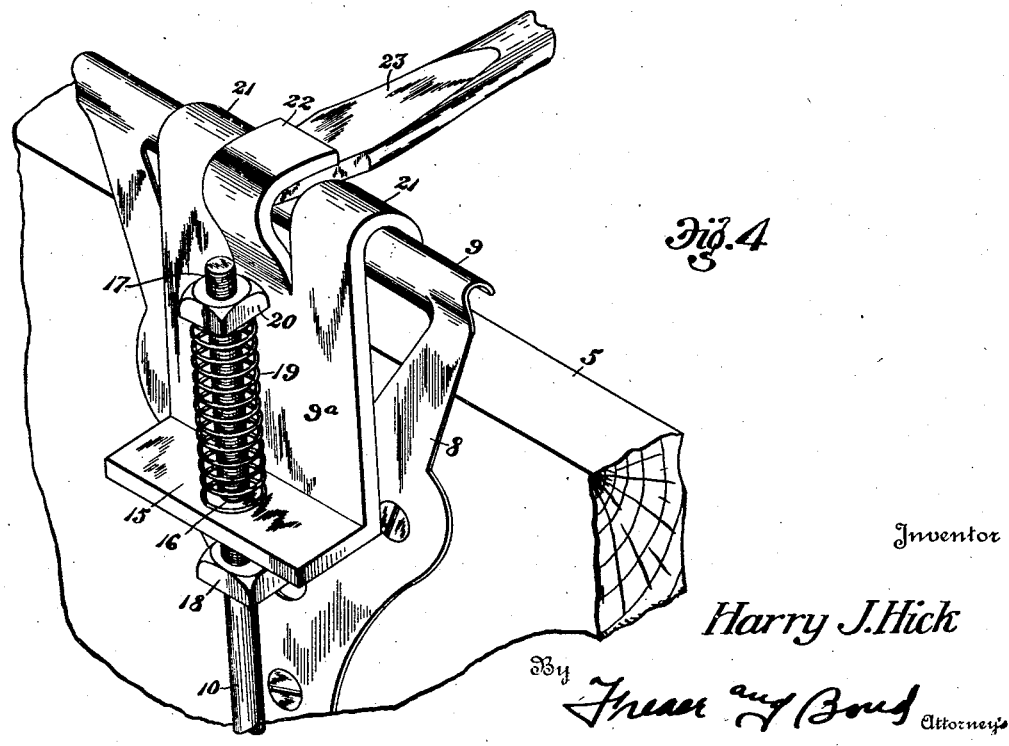

Patented July 19, 1927.

1,636,562

UNITED STATES PATENT OFFICE.

HARRY J. HICK, OF ALLIANCE, OHIO, ASSIGNOR TO THE HYKON MANUFACTURING COMPANY, OF ALLIANCE, OHIO, A CORPORATION OF OHIO.

BATTERY CLAMP.

Application filed February 6, 1922. Serial No. 534,424.

The invention relates to means for securing battery boxes and the like in a supporting frame or receptacle, and the object of the improvement is to provide a yielding clamp which will not be affected by the vibrations of use in an automobile or the like.

A further object of the improvement is to provide a clamp which can be readily attached and detached from the battery box, without turning screws, or operating latches or other locking means; and which will remain in proper position adjacent to the battery box when disengaged therefrom for readily reengaging therewith.

Battery boxes are usually provided with handles on each end having horizontal bars with which a retaining clamp is conveniently engaged; and the present invention involves the use of an upright clamp plate adjacent to each handle bar, adjustably and yieldingly mounted on the upper end of a laterally swinging support and having one or more hooks for engaging the handle bar and a tongue adapted to be engaged by a tool bearing on the handle, for engaging and disengaging the hooks.

A preferred embodiment of the invention is illustrated in the accompanying drawings forming part hereof, in which—

Figure 1:
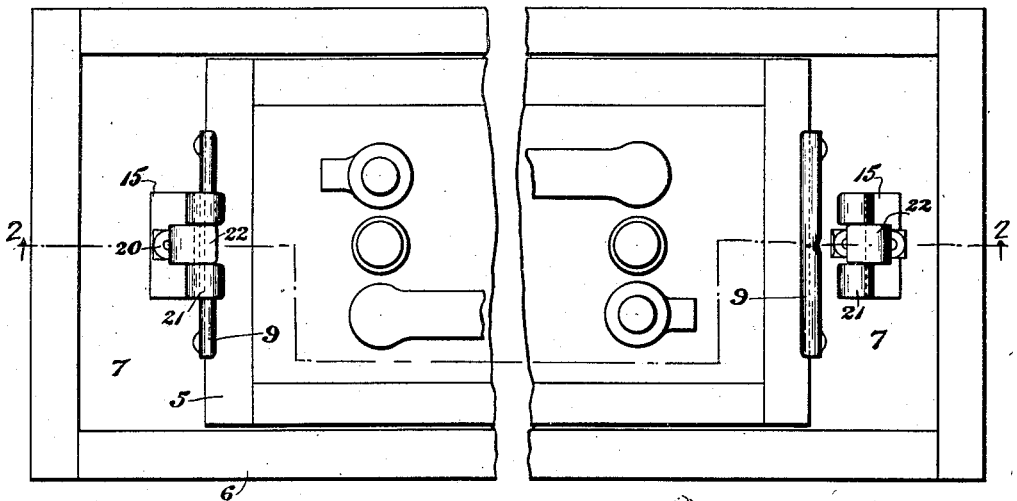
Figure 2:
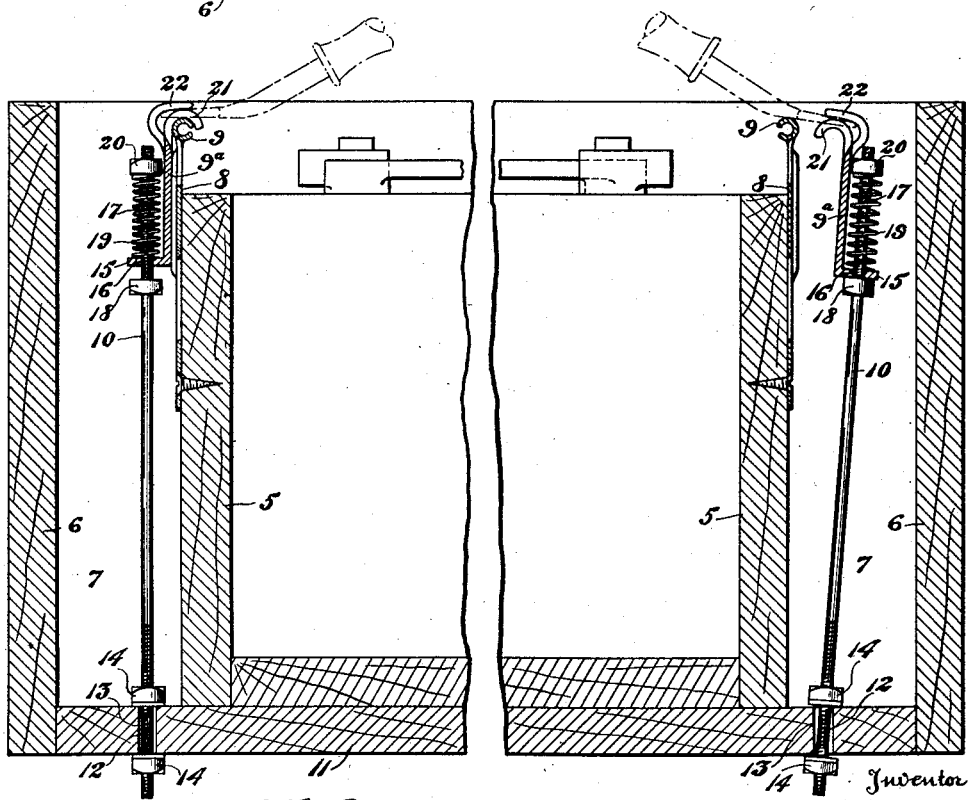

Figure 1 is a plan of a battery box in a receptacle, showing one clamp engaged with the battery handle and the other clamp disengaged therefrom;

Fig. 2, a longitudinal section on line II—II, Fig. 1, omitting contents of the battery box;

Fig. 3, a fragmentary detached perspective view showing a clamp disengaged from a handle, with a tool in position for engaging it therewith; and Fig. 4, a similar view, showing a clamp engaged with a handle, with a tool in position for disengaging it therefrom.

Similar numerals refer to similar parts throughout the drawings.

The battery box 5 and the receptacle 6 may be of any form in common use, and as shown may both be made of wood, with the battery box of suitable dimensions to be seated within the receptacle box, leaving a sufficient interval 7 between the ends of the boxes for receiving the clamping means. The battery box is provided with handles 8 secured on its ends, each having a transverse handle bar 9 located above the upper edge of the box, in well known manner.

The clamping means may include a clamping plate 9ª mounted on the upper end of an upright rod or stem 10; the lower end of which stem is adjustably secured to the bottom 11 of the receptacle, box or other support upon which the battery box rests. As shown, the lower end 12 of the upright stem may be threaded and extended through an enlarged aperture 13 in the bottom 11, and may be held in different positions of adjustment by means of nuts 14 above and below the bottom of the receptacle.

The enlarged aperture permits the upright stem to swing a limited extent to and from the battery box, as shown at the right in Fig. 2; but it will be understood that a swinging of the clamp plate 9 on the upper end of the stem may be permitted by a bending or flexion thereof, if it is desired to connect the stem rigidly to the bottom of the receptacle box.

The upright clamp plate 9ª may be mounted upon the upper end of the stem by an L-flange 15 having an aperture 16 therein for receiving the upper threaded end 17 of the upright stem, upon which stem the plate may be adjusted and secured by means of a nut 18 below the L-plate, a coil spring 19 around the threaded portion of the stem, and a nut 20 on the threaded portion of the stem above the spring.

The lower nut 18 serves as a stop upon which the flange of the clamp plate normally rests, as shown in Fig. 3, and at the right in Fig. 2; and the upper nut serves as a stop for the spring which yieldingly holds the flange of the clamp plate downward, but permits it to yield upward, as shown in Fig. 4 and in the left of Fig. 2.

The particular location of the clamping plate and the pressure of the yielding spring are both controlled by a suitable adjustment of the nuts on the upper end of the stem, and the general position of the clamping plate may also be controlled by the nuts on the lower end of the stem.

The upper end of the upright clamp plate is provided with hooks 21 shaped to inwardly extend and engage over the handle bar 9, and as shown, these hooks may be formed by slitting the upper end of the clamp plate and laterally bending side portions thereof to form the inverted U-shaped hooks shown in the drawings.

The upper end of the clamp plate is also provided with an L-tongue 22 located above the plane of the hooks, which may be formed by laterally bending an intermediate portion of the clamp plate between the hooks which are bent from the side portion thereof.

The parts are proportioned so that the L-tongue will inwardly extend over and at an interval above the handle bar 9, when the hooks are engaged therewith, so that a flat tool, which may be the end of an ordinary screw driver 23, may be entered under the tongue while bearing upon the handle bar and may be used either for engaging the hooks therewith or disengaging them therefrom.

The parts are proportioned and arranged so that when the hooks of the clamp plate are disengaged from the handle bar, the clamp plate will swing outward from the side of the battery handle and the coil spring will hold the plate downward with its hooks at the side of the handle bar, as shown in Fig. 3 and at the right in Fig. 2; in which position the tool 23 may be entered under the L-tongue while resting upon the handle bar, as shown in the same figures, and by depressing the handle of the tool and using the handle bar as a fulcrum upon which the tool may slide, the clamp will be lifted against the depressing action of the spring, and its hooks swung over the handle bar for engagement therewith when the tool is withdrawn from under the tongue.

When the hooks are engaged with the handle bar, the same tool may be entered under the tongue so as to bear upon the handle bar, as shown in Fig. 4 and in the left of Fig. 2; and by raising the handle of the tool, the clamp plate will be raised so as to disengage the hooks from the handle bar and then swung outward to carry the hooks outside the handle bar, after which the clamp plate will spring downward into normal inoperative position when the tool is withdrawn; it being understood that the clamp tongue will slip or slide from the tool at the end of each operation so that an actual withdrawal of the tool is not required.

An ordinary screw driver may be employed for engaging and disengaging the clamp hooks, but in certain cases, the shank of the tool may be bent upward at an interval from its end, as shown in broken lines in Fig. 2, so that the handle of the tool will extend freely above the battery in all its operations.

I claim:

A clamp for the handle bar of a battery box and the like, including a laterally movable member yieldingly mounted alongside the handle and having spaced inwardly extending hooks for engaging the bar and a separate inwardly extending tongue intermediate the hooks and adapted to be lifted by a tool bearing on the bar for engaging and disengaging the hooks.

HARRY J. HICK.